(12) United States Patent
Walsh

(10) Patent No.: US 7,048,301 B2
(45) Date of Patent: May 23, 2006

(54) EXPANDABLE SIDE CURTAIN AIRBAG

(75) Inventor: Robert V. Walsh, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 131 days.

(21) Appl. No.: 10/621,586

(22) Filed: Jul. 17, 2003

(65) Prior Publication Data

US 2005/0012313 A1 Jan. 20, 2005

(51) Int. Cl.
*B60R 21/16* (2006.01)
*B60R 21/22* (2006.01)

(52) U.S. Cl. .................. 280/730.2; 280/743.1

(58) Field of Classification Search ............. 280/743.1, 280/730.2
See application file for complete search history.

(56) References Cited

U.S. PATENT DOCUMENTS

| 4,921,735 | A | | 5/1990 | Bloch |
| 4,977,016 | A | | 12/1990 | Thornton et al. |
| 5,073,418 | A | | 12/1991 | Thornton et al. |
| 5,110,666 | A | | 5/1992 | Menzel et al. |
| 5,533,755 | A | | 7/1996 | Nelson et al. |
| 6,176,515 | B1 | * | 1/2001 | Wallner et al. ........... 280/730.2 |
| 6,237,942 | B1 | * | 5/2001 | Swann .................... 280/730.2 |
| 6,505,853 | B1 | * | 1/2003 | Brannon et al. ......... 280/730.2 |
| 6,672,612 | B1 | * | 1/2004 | Sauer et al. ............. 280/730.2 |
| 6,705,639 | B1 | * | 3/2004 | Masuda ................... 280/730.2 |
| 6,793,240 | B1 | * | 9/2004 | Daines et al. ............... 280/729 |
| 6,796,577 | B1 | * | 9/2004 | Challa et al. ............ 280/730.2 |

FOREIGN PATENT DOCUMENTS

| JP | 10-166981 A | * | 6/1998 |
| JP | 2003-137059 A | * | 5/2003 |

* cited by examiner

*Primary Examiner*—Ruth Ilan
(74) *Attorney, Agent, or Firm*—Terry T. Moyer

(57) ABSTRACT

An airbag having an array of slits formed therein between its two attachment points, each slit seamed to be impermeable to the inflation medium. The slits are oriented to be perpendicular to a line defined by these two attachment points. The slits may be in offset rows and are each longer than the distance between the rows to allow the airbag to be significantly expanded by pulling in opposite directions on its attachment points. The airbag thus made can, when expanded, be folded to fit into a housing running along the roofline of a vehicle. Upon inflation and forcing itself from the housing, it will contract sharply, increasing its tension between attachment points and serving to both cushion and restrain passengers against lateral impact.

6 Claims, 3 Drawing Sheets

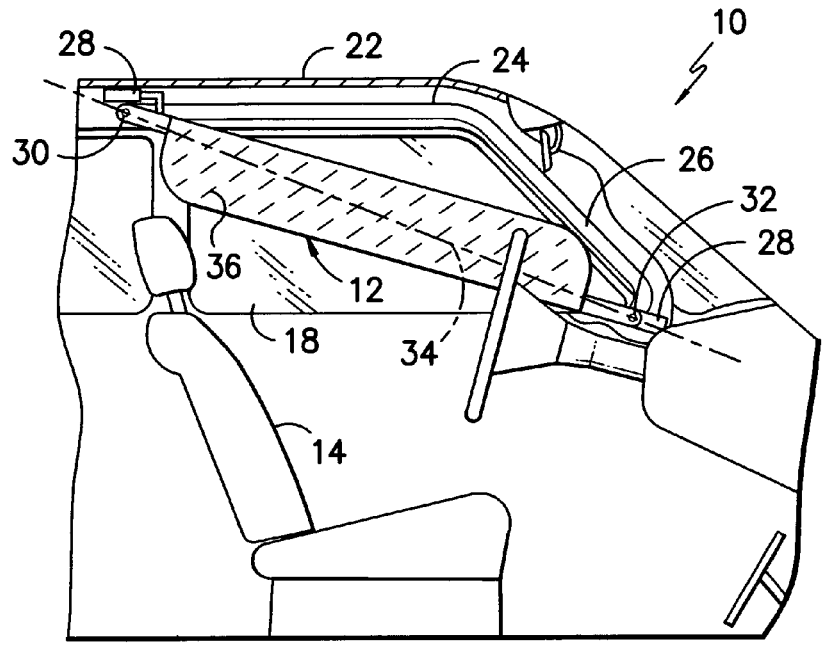
FIG. -1-
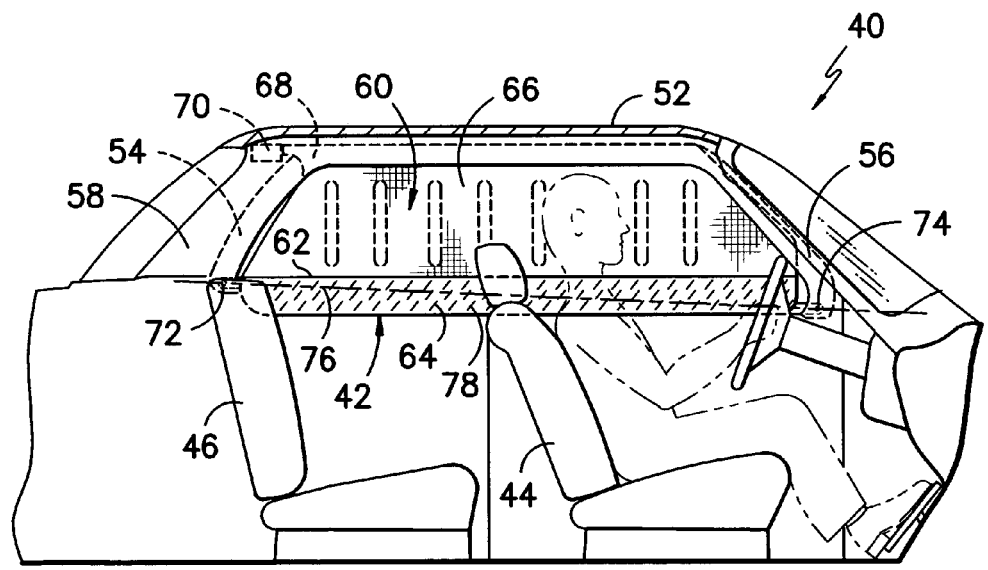
FIG. -2-

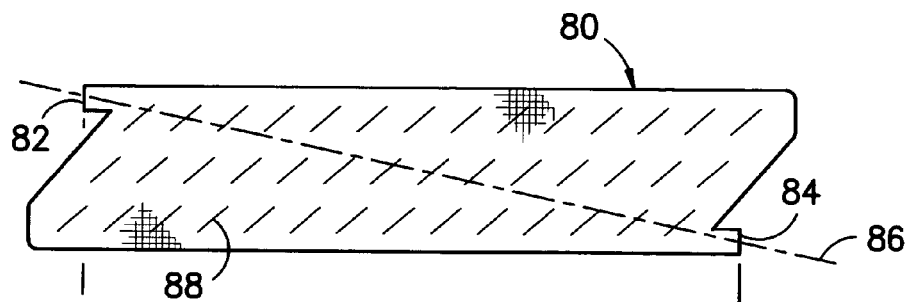
FIG. -3A-
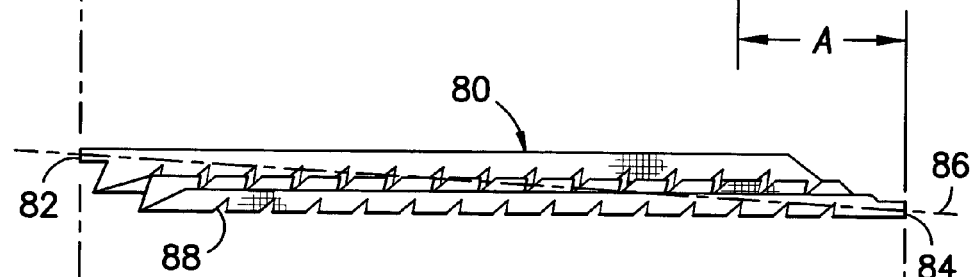
FIG. -3B-
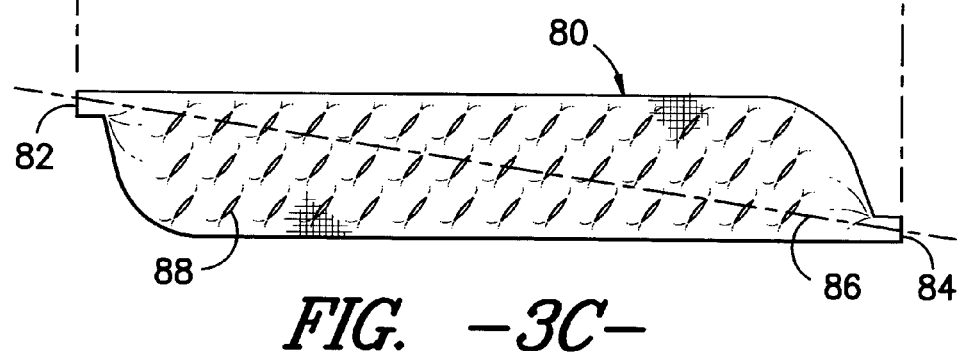
FIG. -3C-

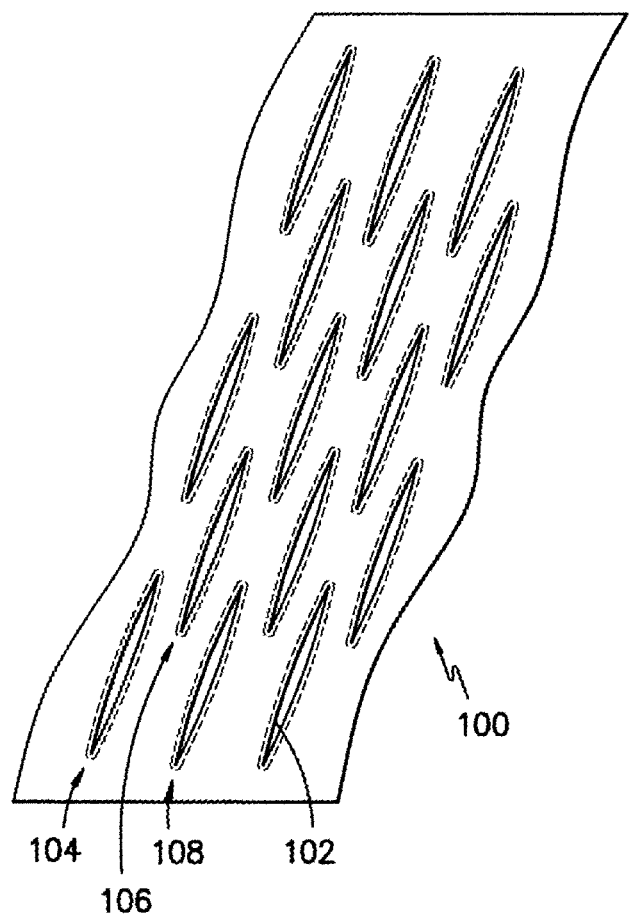
FIG. -4A-
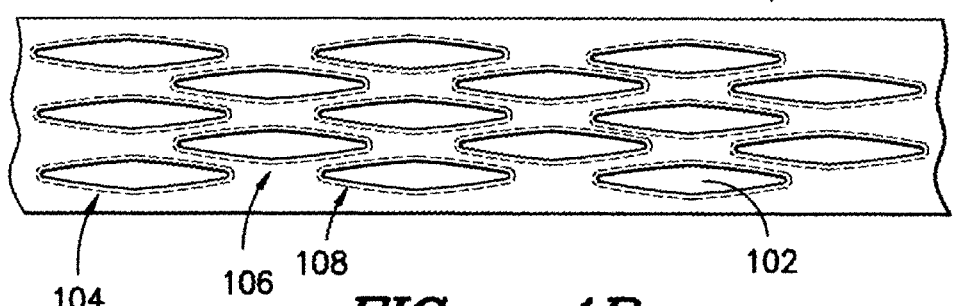
FIG. -4B-

EXPANDABLE SIDE CURTAIN AIRBAG

BACKGROUND OF THE INVENTION

The present invention relates to inflatable protective cushions, and more specifically relates to airbags useful in side protection of occupants in a transportation vehicle, such as an automobile.

Inflatable protective cushions used in passenger vehicles are a component of relatively complex passive restraint systems. The main elements of these systems are: an impact sensing components, an ignition component, a propellant material or stored gas system, an attachment device, an enclosure, and an inflatable protective cushion. Upon sensing an impact, the stored gas system is ignited causing an explosive release of gases filling the cushion to a deployed state that can absorb the impact of the movement of a body against it and dissipate its energy by means of venting of the gas. The entire sequence of events occurs within about 20 milliseconds.

This inflation medium is generally nitrogen or helium gas generated from a gas generator or inflator (the term "airbag" will be used for convenience herein regardless of the inflation medium actually used). The inflation medium is conveyed into the cushion at a relatively warm temperature.

In the un-deployed state, the airbag is most commonly stored in or near the steering column, the dashboard, in a door panel, or in the back of a front seat placing the cushion in close proximity to the person or the object it is to protect.

A typical construction material for airbags has been a polyester or nylon fabric, coated with an elastomer such as neoprene, or silicone. The fabric used in such bags is typically a woven fabric formed from synthetic yarn by weaving practices that are well known in the art. The use of a coating material has found acceptance because it decreases the rate of permeability of the inflation medium. The coating helps to block the permeation of the fabric by such gas, thereby permitting the cushion to rapidly inflate without undue decompression during a collision event.

Airbags may also be formed from uncoated fabric that has been woven in a manner that creates a product possessing low permeability or from fabric that has undergone treatment such as calendaring to reduce permeability. Fabrics that reduce air permeability by calendaring or other mechanical treatments after weaving are disclosed in U.S. Pat. No. 4,921,735; U.S. Pat. No. 4,977,016; and U.S. Pat. No. 5,073,418 (all incorporated herein by reference).

Silicone coatings typically utilize either solvent-based or complex, two-component reaction systems. Dry coating weights for silicone have been in the range of about 3 to 4 ounces per square yard or greater for both the front and back panels of side curtain airbags. Alternatively, the use of a particular type of polyurethane as a coating as disclosed in U.S. Pat. No. 5,110,666 to Menzel et al. (herein incorporated by reference) permits low add on weights reported to be in the range of 0.1 to 1 ounces per square yard but the material itself is relatively expensive and is believed to require relatively complex compounding and application procedures due to the nature of the coating materials.

The driver-side airbags are typically of a relatively simple configuration in that they function over a fairly small well-defined area between the driver and the steering column. One such configuration is disclosed in U.S. Pat. No. 5,533,755 to Nelsen et al., issued Jul. 9, 1996, the teachings of which are incorporated herein by reference. However, inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision.

The majority of commercially used restraint cushions are formed of woven fabric materials utilizing multifilament synthetic yarns of materials such as polyester, nylon 6 or nylon 6,6 polymers.

As will be appreciated, the permeability of the cushion structure is an important factor in determining the rate of inflation and subsequent rapid deflation following the impact event. In order to control the overall permeability of the cushion, it may be desirable to use differing materials in different regions of the cushion. Thus, the use of several fabric panels in construction of the cushion may prove to be a useful design feature. The use of multiple fabric panels in the cushion structure also permits the development of relatively complex three-dimensional geometries that may be of benefit in the formation of cushions for passenger side applications wherein a full bodied cushion is desired. While the use of multiple fabric panels provides several advantages in terms of permeability manipulation and geometric design, the use of multiple fabric panels for use in passenger side restraint cushions has historically required the assembly of panels having multiple different geometries involving multiple curved seams.

As will be appreciated, an important consideration in cutting panel structures from a base material is the ability to maximize the number of panels which can be cut from a fixed area through close-packed nesting of the panels. It has been found that minimizing the number of different geometries making up panels in the cushion and using geometries with substantially straight line perimeter configurations generally permits an enhanced number of panels to be cut from the base material. The use of panels having generally straight-line profiles has the added benefit of permitting the panels to be attached to one another using substantially straight seams or to be substantially formed during the weaving process using a jacquard or dobby loom. For the purposes of this invention, the term "seam" is to be understood as any point of attachment between different fabric panels or different portions of the same fabric panel. Thus, a seam may be sewn (such as with thread), welded (such as by ultrasonic stitching), woven (such as on a jacquard or dobby loom, as merely examples), and the like. The key issue regarding seam length within this invention pertains to the ability to form a highly available inflation airspace volume cushion with the lowest amount of labor needed. Since sewing, welding, etc., procedures to connect panels or portions of panels greatly increases the time necessary to produce airbag cushions, it is highly desirable to reduce the labor time which can be accomplished through the reduction in the length of seams required. Substantially straight seam configurations thus provide more cost-effective methods of producing such airbags.

As alluded to above, in addition to driver-side and passenger-side airbags, there are side impact and side curtain airbags. Side impact airbags are linear, tubular structures; side curtain airbags are panel-like and cover a larger area. These both have been designed primarily to protect passengers during side crashes and to provide rollover protection, unfolding from packing housings stored within the roofline along the side windows of an automobile (and thus have a back and front side only). Side curtain airbags not only provide cushioning effects but also provide protection from broken glass and other debris. As such, it is imperative that side curtain airbags, as noted above, retain large amounts of gas, as well as high gas pressures, to remain inflated throughout the longer time periods of the entire potential rollover situation. To accomplish this, these side curtains are generally coated with very large amounts of sealing materials on both the front and back. Since most side curtain airbag fabrics comprise woven blanks that are either sewn, sealed, or integrally woven together, discrete areas of potentially high leakage of gas are prevalent, particularly at and around the seams.

In addition to the duration of air retention, side impact airbags and side curtain airbags must be able to contract upon inflation to achieve a high degree of tension against the lateral force of the occupants of the vehicle. Ideally, this tension should be as high as possible, and be sufficiently high with relatively low volumes of air in the airbag so that, even while still inflating, they provide restraint against lateral forces.

SUMMARY OF THE INVENTION

In view of the foregoing, it is an object of the invention to provide an airbag that has higher tension upon inflation. Thus, the present airbag, which may be used as side impact airbag in a stand-alone configuration, or may be added to a side curtain airbag along its bottom edge to increase the tension along that edge, achieves this object by its design. Specifically, it is an inflatable tubular structure with a series of sealed slits which sometimes are formed perpendicular to a line between the anchoring points of the airbag. The slits are preferably arranged in staggered rows in a brick pattern with the length of each slit being longer than the distance between rows. These slits allow the uninflated airbag to be stored in its housing along the roof lie. Upon inflation, the present airbag tends to contract to its uninflated length but, because it is restrained at the anchoring points, it cannot. Therefore, its tension increases significantly.

One feature of the present invention is the series of slits perpendicular to a line between the airbag's anchoring points. When the slit airbag is stretched along this line for attachment in the uninflated state to the anchors, the airbag expands in the same manner as expanded metal grating. Because of the slits, the airbag can be stretched over a greater distance than covered by its woven shape. Upon inflation, relatively little air causes the airbag to tend to contract to its original un-stretched configuration, resulting in high tension at low air volumes.

One advantage of the present invention is that it can be adapted for both use in side impact airbags and side curtain airbags, providing tension in either configuration.

Another advantage of the present invention is that it is a change in configuration of an otherwise standard inflatable tubular structure, readily achievable by making a simple series of sealed slits. Implementing the invention, as a result, is simplified and requires no change in the airbag housing or packing procedures or in the airbag composition.

Additional features and advantages of the invention will be set forth in part in the description which follows, and in part will be obvious from the description, or may be learned by practice of the invention. The features and advantages of the invention will be realized and attained by means of the elements and combinations particularly pointed out in the written description and claims as well as the appended drawings.

It is to be understood that both the foregoing general description and the following detailed description are exemplary and explanatory only and are not restrictive of the invention, as claimed.

BRIEF DESCRIPTION OF THE DRAWINGS

The accompanying drawings which are incorporated in and constitute a part of this specification, serve to illustrate several preferred embodiments and practices according to the present invention and together with the description, serve to explain the principles of the invention wherein:

FIG. 1 is a view of the interior of a passenger vehicle with a deployed inflatable side impact airbag, according to a preferred embodiment of the present invention.

FIG. 2 is a view of the interior of a passenger vehicle with a deployed inflatable side cushion airbag, according to a preferred embodiment of the present invention.

FIGS. 3A, 3B and 3C illustrate detailed views of an airbag according to a preferred embodiment of the present invention, with FIG. 3A illustrating the uninflated airbag, FIG. 3B illustrating the folded stretched airbag, and FIG. 3C illustrating the inflated airbag, according to a preferred embodiment of the present invention.

FIGS. 4A and 4B illustrate a portion of an inflatable airbag structure before and after expansion, according to a preferred embodiment of the present invention.

DESCRIPTION OF EMBODIMENTS

Reference will now be made in detail to preferred embodiments and practices. It is, however, to be understood that reference to any such embodiments and practices is in no way intended to limit the invention thereto. On the contrary, it is intended by the applicants to cover all alternatives, modifications and equivalents as may be included within the spirit and scope of the invention as defined by the appended claims.

An embodiment of an airbag deployment system according to the present invention for use in restraining lateral movement of a passenger seated in the front of a vehicle is illustrated in FIG. 1, and an alternative but also preferred embodiment of an airbag system according to the present invention for use in restraining lateral movement of passengers seated in either the front or back seats of a vehicle is illustrated in FIG. 2. As depicted in FIG. 1, an interior of a vehicle 10 after inflation of a side impact airbag 12 is shown. The vehicle 10 includes a front seat 14, a front-side window 18, a roofline 22, within which is stored an elongated housing 24. Airbag 12 is stored in elongate housing 24 prior to deployment. Roofline includes at least a portion of "A" pillar 26. Also present within roofline 22 is an inflator assembly 28 that ignites and forces an inflation medium into the interior of airbag 12 upon the occurrence of a collision event.

Most side curtain airbag systems include an attachment point that moves along a track. In the undeployed state, the attachment is at the top of the roofrail, in either the A, B, or C pillar. When the bag deploys, the attachment moves to the bottom of the track, approximately even with the bottom of the side windows. This movement may be caused by the inflating bag, by a spring, or other mechanical device. Thus, the invention may apply to a non-fixed or a fixed attachment. Also for side curtains, there may be multiple fixed attachments along the top of the bag. Since the slits allow the bottom of the bag to move independently of the top, these attachments are not affected.

Airbag 12 is stored in housing 24 until a collision event occurs. Then airbag 12, at the start of inflation, forces itself out of housing 24 by the sudden increase in its internal pressure, fully inflates, contracting as it does, and then slowly deflates. In FIG. 1, airbag 12 is shown deflated after inflation. Airbag 12 is attached to vehicle 10 by attachment points 30, 32, at its opposing ends. These attachment points 30, 32, define a line 34 therebetween. A series of slits 36 is formed in airbag 12 that are oriented approximately perpendicular to line 34 to the inflation medium. Preferably slits 36 are arranged in plural rows; most preferably, slits 36 are staggered, with respect to slits 36 from an adjacent row, in a pattern similar to that used when laying bricks. The length of slits 36 is preferably longer than the distance between rows of slits 36.

FIG. 2 illustrates a similar vehicle 40 equipped with a side curtain airbag 42. Vehicle 40, much like vehicle 10, has a front seat 44, a back seat 46, a front-side window and a back-side window (not visible through airbag 42), a roofline 52, within which is stored an elongated housing 54. Airbag 42 is stored in elongated housing 54 running from the "A" pillar 56 to the "C" pillar 58 of vehicle 40. Side curtain airbag 42 includes a panel 60 with a bottom edge 62 carrying an inflatable structure 64 similar in construction and operation to side impact airbag 12. As illustrated, Panel 60 is an inflatable panel with several passages 66 for receiving an inflation medium. A nozzle 68 in fluid communication with inflatable structure 64 and panel 66, is used to fill passages 64 with inflation medium from an inflation assembly 70. Nozzle 68 may also be carried by inflatable structure 64 or two nozzles 68 may be carried by airbag 42, one for inflatable structure 64 and one for panel 66.

As with airbag 12, airbag 42 is stored in housing 54 until a collision event occurs, whereupon airbag 42 inflates. Airbag 42 is shown in FIG. 2 after inflation in the post-collision, deflated condition.

Airbag 42 has two attachment points 72, 74, at opposing sides of inflatable structure 64. Attachment points 72, 74, define a line 76 therebetween. Along inflatable structure 64 are slits 78 that are oriented generally perpendicular to line 76. Each slit 78 is seamed to be impermeable to the inflation medium. Preferably, there are plural rows of slits 78 and most preferably, as in airbag 12, slits 78 in one row are staggered with respect to slits in an adjacent row in a typical brick pattern. As in airbag 12, slits 78 in airbag 42 are preferably longer than the distance between adjacent rows of slits 78.

The present invention may be used either as a side impact airbag 12 or as the inflatable structure 64 along bottom edge 62 of a side curtain airbag 42 in the same manner as conventional side impact and side curtain airbags. Whether as an airbag 12 or part of airbag 42, the present invention employs the same types of materials and similar methods of fabrication. The difference between airbags according to the present invention and prior art airbags is in the structure that allows a given length of airbag material to be expanded so that it can be attached to attachment points 72, 74, and stored in housing 54 prior to use so that, when inflated, its tension increases significantly, particular on small volumes of inflation medium.

Referring now to FIGS. 3A, 3B and 3C, there is shown an airbag 80 according to the present invention prior to storing in a housing, partially folded and expanded for storage in a housing, and inflated, respectively. Airbag 80 has opposing points of attachment 82, 84 that define a line 86 therebetween. Airbag 80 has plural slits 88 formed therein and oriented to be perpendicular to line 86. Slits 88 are arranged in rows and the slits 88 of each row are staggered with respect to an adjacent row, as will be described in more detail below.

Each slit 88 is surrounded by a seam impermeable to the inflation medium and is preferably longer than the width of the inflatable chamber between each row of slits 88. Preferably airbag 80 is made on a weaving machine with a jacquard head; however, the present airbag 80 may also be made using flat fabric that is cut and sewn.

When airbag 80 is stretched along line 86, slits 88 open so that airbag 80 expands along line 12 by a distance A. Distance A is a function of the number and length of slits 88. Without slits 88, airbag 80 would not expand to the same extent. The length of airbag 80 when fully expanded can reach from one attachment point to another along the roofline of vehicle and be folded into housing that houses airbag 80 prior to deployment.

The effect of expanding an inflatable airbag according to a preferred embodiment of the present invention is seen by comparing the portion of such a structure illustrated in FIGS. 4A and 4B. An inflatable structure 100 has slits 102 formed therein. Each slit 102 is seamed to be impermeable against leakage of the inflation medium. Slits 102 are arranged in rows. As illustrated, the first row 104 has three slits 102 followed by an adjacent row with two slits 102, and then a next row 108 with three slits 102 and so on. When inflatable structure 100 is expanded by applying opposing forces to its attachment points (not shown in FIGS. 4A and 4B), it expands or stretches as slits 102 change shape, first opening and then closing in an orientation aligned in the direction of the opposing forces.

In the event of an accident, airbag 80 will begin to inflate, forcing itself from its housing as it expands in width and shortening its length as it does so. On inflation, the pressure in the bag will tend to force the bag to assume its original pre-stretched configuration, significantly reducing its length and increasing its tension. Because it is fixed to the vehicle at attachment points 82, 84, it cannot shorten once it is free of its housing into which it had been stuffed prior to inflation. Rather, from the time shortly after it exits the housing, it can only increase in tension as inflation medium swells the interior of airbag 80. Furthermore, this tension will have increased significantly and quickly, even at low volumes and pressure. Thus airbag 80 will provide restraint more quickly than airbags that do not achieve the same tension given a flow of inflation medium. Correspondingly, the present invention may provide sufficient tension and corresponding restraint at internal pressures that are lower than conventional airbags so that pressure can be limited. Lower internal pressures provide gentler and safer cushioning.

Those skilled in the art of airbag design for passenger restraints will appreciate that many substitutions and modifications may be made to the preferred embodiments described herein without departing from the spirit and scope of the present invention, which is defined by the appended claims.

What is claimed is:

1. An airbag, comprising:
    a substantially closed, inflatable structure having a first anchor point and an opposing second anchor point, said structure having plural slits formed therein, said slits seamed to be impermeable to an inflation medium; and
    a fill nozzle carried by said structure, said inflatable structure expanding when opposing forces are applied to said first and second anchor points and contracting when said inflatable structure is inflated, wherein said slits are arranged in plural rows and each row of slits of said plural rows of slits is offset from an adjacent row of slits.

2. The airbag as recited in claim 1, wherein said slits are longer than the distance between said plural rows.

3. An airbag, comprising:
a panel having air passages formed therein and a bottom edge;
a substantially closed inflatable structure carried by said bottom edge of said panel and having a first anchor point and an opposing second anchor point, said inflatable structure having plural slits formed therein, said plural slits being seamed to be impermeable to an inflation medium; and
a fill nozzle in fluid communication with said air passages of said panel and said structure, said inflatable structure expanding when opposing forces are applied to said first and said second anchor points and contracting when said inflatable structure is inflated.

4. The airbag as recited in claim 3, wherein said plural slits are arranged in at least one row.

5. The airbag as recited in claim 3, wherein said plural slits are arranged in plural rows and each row of slits of said plural rows of slits is offset from an adjacent row of slits.

6. The airbag as recited in claim 5, wherein said plural slits are arranged in plural rows and wherein each slit of said plural slits is longer than the distance between said plural rows.

* * * * *